May 21, 1935.  H. A. DOUGLAS  2,002,220
SWAGING MEANS
Filed Dec. 29, 1932  3 Sheets-Sheet 1
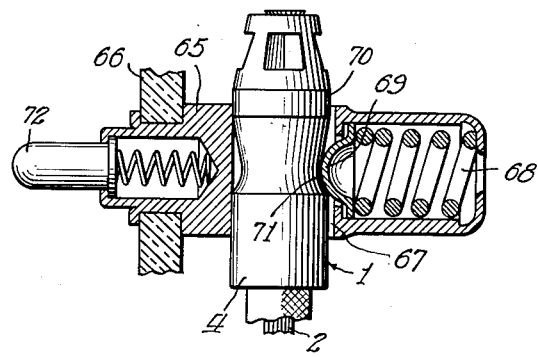
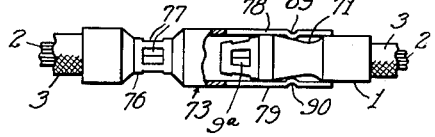
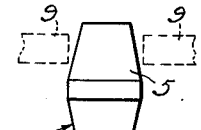
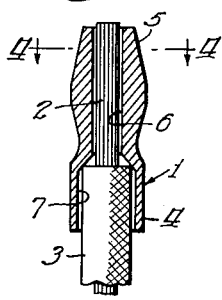
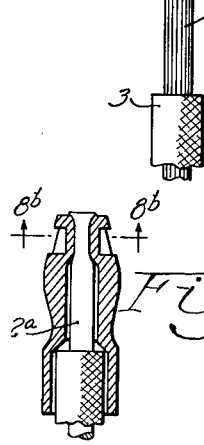
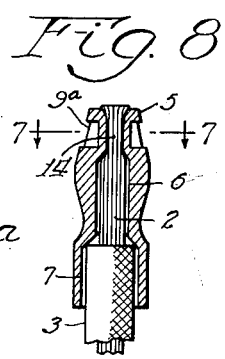
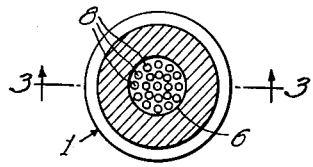
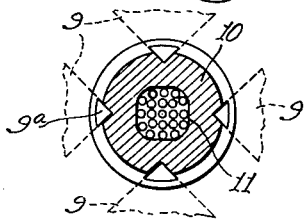
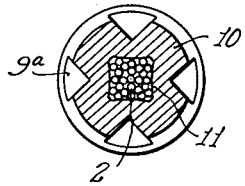
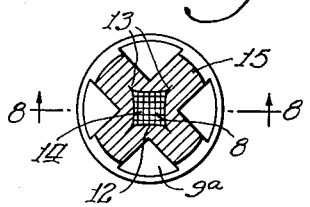
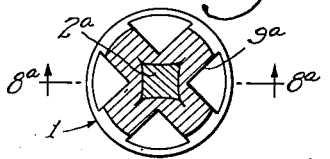
Inventor
Harry A. Douglas
By: Langdon Moore
Atty May 21, 1935. H. A. DOUGLAS 2,002,220
SWAGING MEANS
Filed Dec. 29, 1932 3 Sheets-Sheet 2
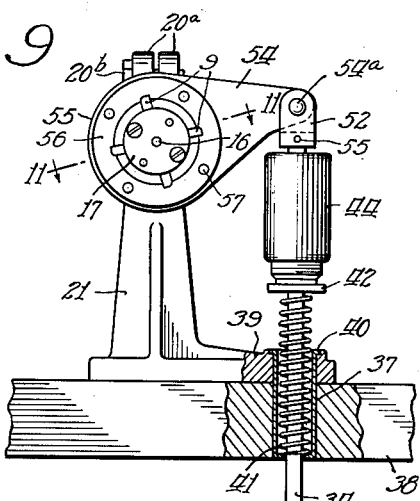
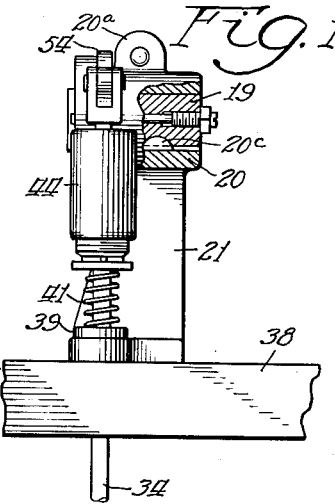
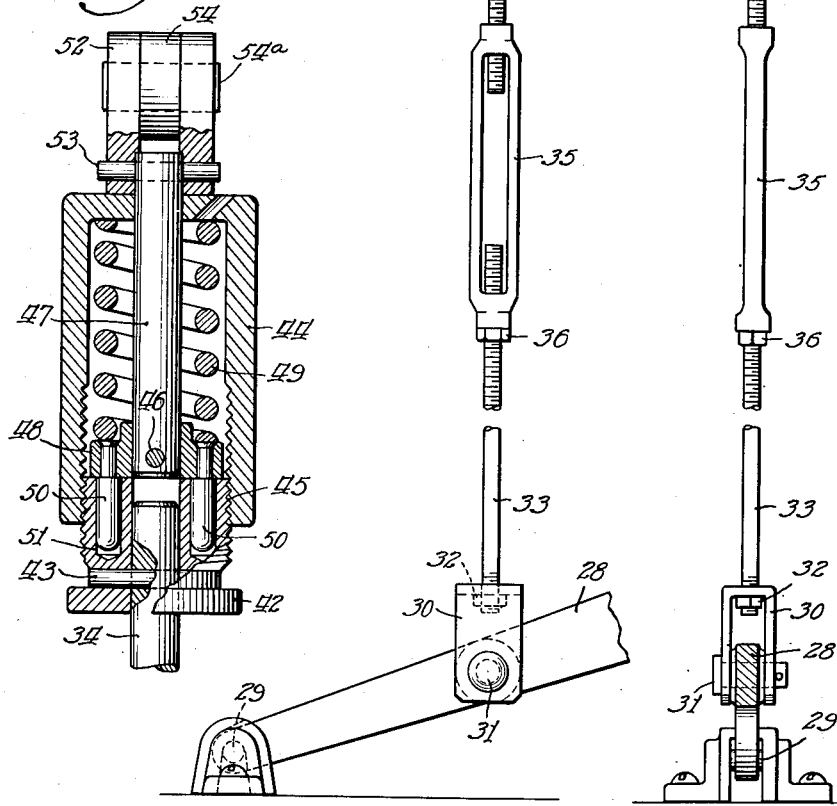
Inventor
Harry A. Douglas
By: Langton Moore
Atty.

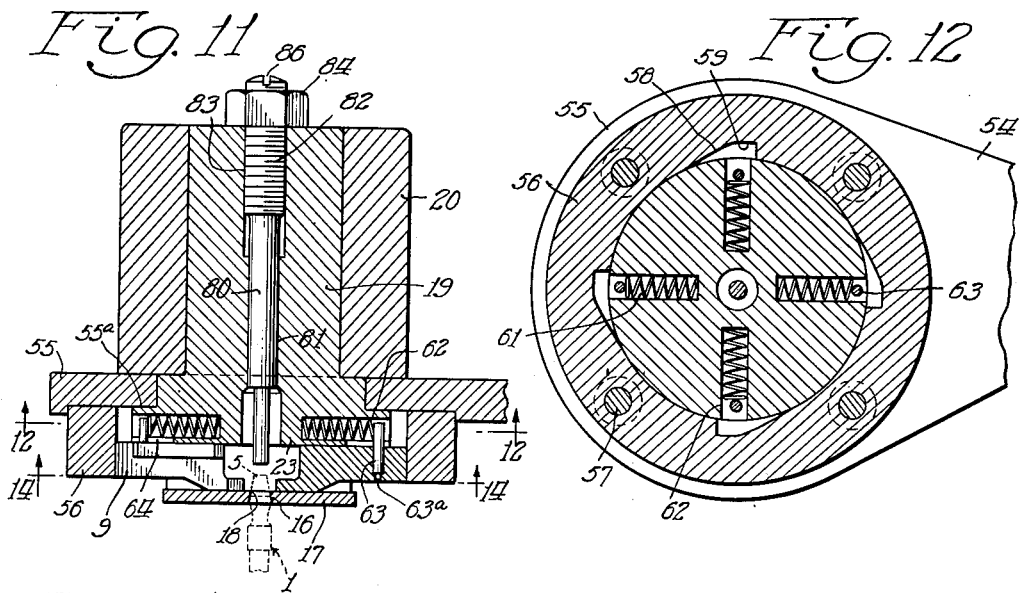
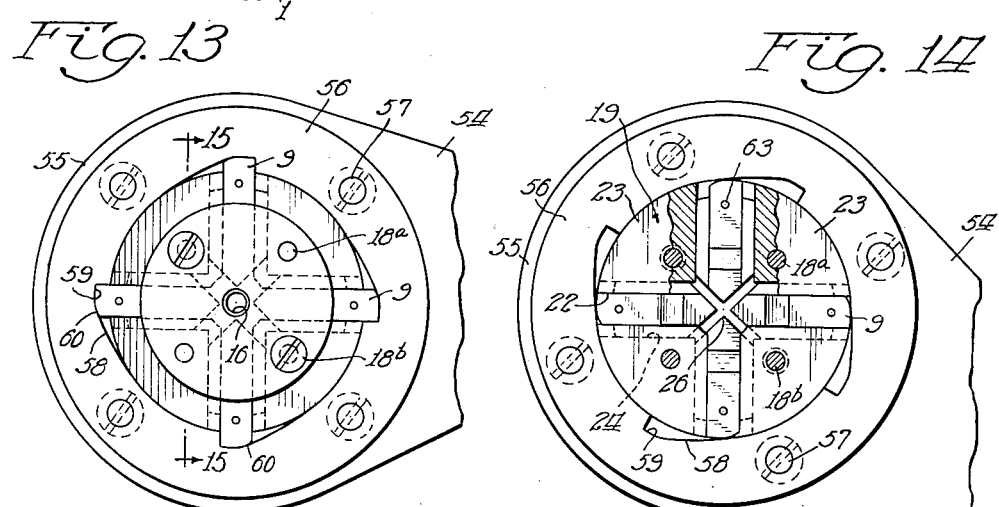
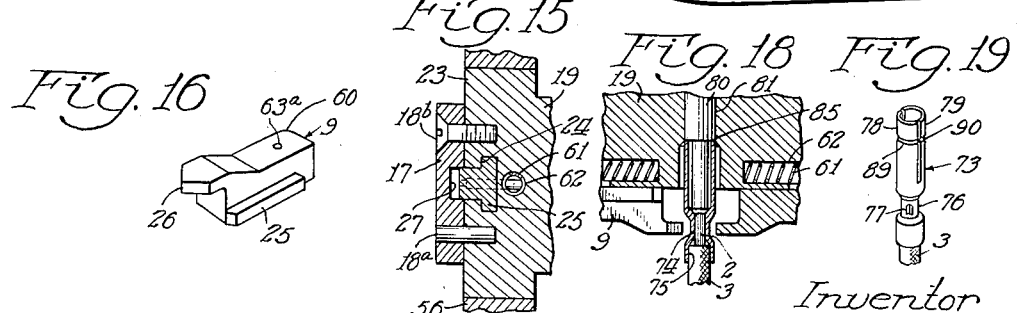

Patented May 21, 1935

2,002,220

UNITED STATES PATENT OFFICE 2,002,220

SWAGING MEANS

Harry A. Douglas, Bronson, Mich.

Application December 29, 1932, Serial No. 649,285

13 Claims. (Cl. 78—21)

This invention relates to swaging machines more particularly for producing terminal and wire couplings for electrical conductors.

Among other objects, the invention aims to provide an improved and simplified means for producing by swaging or compression, a coupling between a metallic terminal and a current conducting wire, in which the terminal is so joined to the wire as to reduce the voltage drop therebetween substantially to zero.

Another important object of the invention is to provide a coupling between the wire and the terminal without the use of solder, which at the same time will be stronger and more flexible than connections produced with solder, and which is not liable to deterioration or disconnection.

My invention is inclusive of automatic means for regulating the pressure applied so that not only the terminal but the wire as well is sufficiently compressed to almost fuse the terminal and wire together while at the same time stopping short of breaking or weakening the parts.

This application is a continuation in part of my copending application, Serial No. 602,912, filed April 4, 1932, entitled Method of producing wire terminals.

The invention will be more fully explained by reference to the illustrative constructions shown in the accompanying drawings in which—

Figure 1 shows in elevation a coupling produced by the use of my invention and associated with one conventional circuit continuing device, shown largely in cross-section;

Figure 2 is a view somewhat reduced, of the plug and the wire for which it is to constitute a terminal, in separated relation, this view indicating a preliminary step in the practice of the invention, a portion of means for compressing the plug being diagrammatically indicated in dotted lines;

Figure 3 is an axial section of the plug of Figure 2, but showing a terminal and wire in proper relation to be swaged;

Figure 4 is an enlarged cross-section taken on the line 4—4 of Figure 3;

Figure 5 is a view similar to Figure 4, but indicating an intermediate stage in the production of the improved coupling, the operation of the swaging members being indicated somewhat diagrammatically;

Figure 6 is a view similar to Figures 4 and 5, but indicating a still later stage;

Figure 7 is a view similar to Figures 4, 5, and 6, but indicating the final stage in the production of the wire and terminal coupling, and is a cross-section taken on the line 7—7 of Figure 8;

Figure 8 is an axial section of the plug, with the wire shown in elevation, showing the completed coupling, and is a section taken on the line 8—8 of Figure 7, reduced to the scale of Figures 2 and 3;

Figure 8a is a view similar to Figure 8 illustrating use of a solid wire;

Figure 8b is a cross section taken on the line 8b—8b of Figure 8a;

Figure 9 is a front elevation, partially in section, showing illustrative mechanism for practicing the invention;

Figure 10 is a side elevation of the mechanism of Figure 9 with parts being shown in section;

Figure 11 is a cross-section taken on the line 11—11 of Figure 9 on a larger scale;

Figure 12 is a vertical section taken on the line 12—12 of Figure 11;

Figure 13 is a front elevation of the structure of Figure 11, showing one operative position of the parts;

Figure 14 is a section taken on the line 14—14 of Figure 11, showing parts broken away and indicating a different operative position of the mechanism from the position shown in Figure 13;

Figure 15 is a partial section taken on the line 15—15 of Figure 13;

Figure 16 is a perspective view of an illustrative swaging member;

Figure 17 is an enlarged section of a portion of the structure of Figure 9, parts being shown in elevation;

Figure 18 is a partial section on a somewhat reduced scale, similar to Figure 11 but showing another type of terminal being swaged;

Figure 19 is a perspective view of this latter type terminal shown in cross-section in Figure 18; and Figure 20 is a side elevational view showing the two types of terminals illustrated, associated together to form a line connection.

In the illustrative construction shown in Figures 1 to 8, I have shown a generally cylindrical metallic plug 1 adapted to form a terminal for the current conducting wire 2 which generally carries the insulation 3. The plug 1 is preferably formed with a straight shank portion 4 and a tapered tip portion 5. Referring particularly to Figure 3, the plug 1 is desirably first bored axially throughout its entire length as at 6, to receive the bared end of the wire 2 stripped of the insulation 3. The bore 6 is desirably counterbored as at 7, to permit a portion of the wire 2 with insulation thereon to be received in the shank portion 4 of the plug to an extent that the end of the wire 2 is substantially flush with the end of the tip 5 of the plug.

In this instance the wire 2 is stranded and is composed of the metallic strands 8, but the wire may be a solid wire, such as the wire 2a shown in Figures 8a and 8b. As shown in the cross-sectional view Figure 4, when the wire 2 is first inserted in the bore 6 of the plug 1, as shown in Figure 3, each of the strands 8 is substantially cylindrical, leaving interstices between the strands themselves and between the strands and the wall of the bore 6. In accordance with my invention, I swage the metal of the plug and the metal of the strands 8 so that these interstices are substantially eliminated.

In Figure 5 I have shown a preferred next stage in the illustrative process to produce a swaged terminal, in which the plug 1 is engaged by swaging members such as the jaws 9, in this instance four in number, arranged ninety degrees apart about the axis of the plug, the oppositely disposed jaws constituting pairs. When moved centripetally, i. e. toward the axis of the plug, the jaws 9 force portions of the wall 10 of the plug 1 inwardly toward the bore 6, so that the bore is somewhat reduced in cross-sectional area as at 11.

In the illustrative construction the jaws 9 are desirably V-shape as shown, and produce the V-shape indentations 9a in the tip 5 of the plug 1, so that the reduced bore 11 tends to assume a square cross-sectional configuration, and this configuration is accentuated as the jaws 9 move further inwardly to cause the plug at the point engaged by the jaws to assume the cross-sectional appearance shown in Figure 6, in which condition the strands 8 of the wire 2 receive in the bore 6 of the plug have been forced closer together than in the condition of Figures 4 and 5 and interengaging shoulders have begun to form between the plug and wire. As the jaws 9 arrive at the limit of their movement centripetally of the plug 1, as shown in Figure 7, the bore of the plug in the region of engagement of the plug with the jaws has assumed the cross-section 12, so that both the wire and the terminal are substantially compressed and practically forced together, since the effective cross-sectional area of the bore has been substantially reduced from that of Figure 4. This substantial reduction is made possible in part by the V-shape jaws which permit the metal at the corners of the reduced bore at 12 to fold together, as at 13, thus enhancing the reduction of the bore. Also the strands 8, which in the step shown in Figures 5 and 6 were forced closer together, next, as shown in Figure 7, have their available cross-sectional area of occupancy so reduced that they are deformed from their original circular cross-section and are forced to assume a substantially square cross-section, as shown at 14, thus practically eliminating interstices between the strands themselves and between the strands and the deformed walls 15 of the bore at 12. This substantially square cross-section which is given the bore and the strands, in accordance with my invention, practically eliminates air spaces between the strands themselves and between the strands and the wall of the bore, so that the entry of moisture therebetween is prevented and the voltage drop between the wire 2 and the plug 1 is reduced substantially to zero. At the same time, I obtain a practically fused metal-to-metal contact between the wire and the plug and the necessity of solder is entirely eliminated. Thus I obtain a much stronger and more flexible connection between the wire and the plug than is possible with any means employing solder.

I will next describe one illustrative mechanism for controlling the jaws described above. In Figures 9 and 10 I have shown a suitable machine for receiving and maintaining in position the plug 1 with the wire 2 inserted therein, and means for guiding and forcing the jaws 9 inwardly of the plug as described, together with means for limiting the inward movement of the jaws for a purpose described.

As here shown, the tapered tip 5 of the plug 1, with the wire 2 therein, is inserted through a circular aperture 16 in the guide plate 17. The aperture 16 has its diameter slightly reduced from front to rear of the plate 17, as at 18, so as snugly to receive the tapered outer end of the tapered tip 5 and limit the extent of insertion of the tip in the aperture 16. The guide plate 17 may be secured by tap bolts 18b and centering pins 18a to a cylinder 19, which is fixed in a housing 20. The housing 20 may have ears 20a through which may pass a bolt 20b by tightening which the housing may be clamped about the cylinder 19 and thus firmly secure the cylinder in the housing. To further insure against rotation of the cylinder 19 in the housing 20 these parts may be keyed together as at 20c.

In this instance each of the jaws 9 is in the form of a generally oblong block of metal as shown in Figure 16. These jaws are reciprocably received in radial grooves 22 in the cylindrical face 23 of the cylinder 19. The grooves 22 are desirably undercut, as at 24, to receive the feather portions 25 of the jaws 9, thus preventing the jaws from being displaced laterally of the grooves 22. As already mentioned, the portions of the jaws 9 which engage the plug 1 desirably have a V-edge, as indicated at 26, the sides of the V being in a plane parallel to the plate 17 and therefore in a plane perpendicular to the axis of the plug 1. These V-shaped terminations 26 of the jaws 9 are reduced in thickness, are somewhat offset outwardly of the grooves 22, and are received in guide grooves 27 in the plate 17 which mate with the grooves 22 in the face 23. The V-shape terminations 26 are thus directed toward the plug 1 when the plug is inserted in the aperture 16, and tend to converge at a point which is coincident with the axis of the plug 1, the V-shape terminations being complementary and forming complementary sectors, or in this instance, quadrants of a circle in a plane perpendicular to the axis of the plug.

To force the jaws 9 inwardly in this manner and against the plug 1 when located in the aperture 16, I provide actuating means which in this instance is foot operated by a treadle partially shown at 28 and suitably pivoted at 29 for example, on the floor of a factory. A yoke 30 is pivoted to the lever 28 as at 31, and receives between its sides, held by a nut 32, a power transmitting member such as the threaded rod 33. Another and oppositely threaded rod 34 is connected with the rod 33 by a conventional turn-buckle 35 by which the combined length of the rods 33 and 34 may be reduced or increased, as desired, to control the angle of the lever 28 with respect to the floor. The position of the turn-buckle 35 when adjusted may be fixedly maintained by a lock nut 36. The rod 34 is passed through a spring barrel 37 which in turn may pass through a bench 38 upon which is mounted the pedestal 21 which supports the housing 20. The spring barrel 37 is desirably carried by the pedestal 21 by means of an extension 39 of the pedestal which receives the upper end of the spring barrel, and the spring barrel is provided with a retaining lip 40.

Bottomed in the spring barrel 37 is a coil spring 41 which surrounds the rod 34 and abuts at its upper end a threaded cylindrical block 42 which receives the upper end of the rod 34 as best shown in Figure 17. A transverse pin 43 passing through the block 42 and rod 34 may fix the relationship of these parts. Thus arranged, the coil spring 41 urges the block 42 and rod 34 upwardly.

The block 42 is also exteriorly threaded as at 45 to receive thereover the internally threaded sleeve 44. The sleeve 44 houses a plunger 47 which has a head 48 fitting loosely in the sleeve 44 and providing an abutment for one end of the coil spring 49 which also is housed by the sleeve 44 and abuts at its other end against the closed top of the sleeve. The plunger head 48 may be secured to the plunger 47 by a transverse retaining pin 46. The plunger 47 is movable in the sleeve 44 against the action of the spring 49, and to guide the plunger 47 in its movement it desirably has riveted to its free end guide pins 50 which are snugly but slidingly received in axial recesses 51 in the block 42. The plunger 47 passes upwardly through the sleeve 44 and is secured at its upper end to a yoke 52 as, for example, by a transverse pin 53 passing through the yoke 52 and plunger 47. The yoke 52 pivotally embraces an arm 54, articulated thereto by a pivot pin 54a.

The arm 54 actuates camming mechanism which moves the jaws centripetally. As here shown the arm 54 is integral with a rotatable annulus 55 which surrounds the fixed cylinder 19 and a rotatable cylindrical cam 56. The cam member 56 may be secured to the annulus 55, as by tap screws 57, to rotate with the annulus 55 upon movement of the arm 54. The inner face or periphery of the cam 56 is provided with tangential cam surfaces 58 terminating in recesses 59 in the inner face of the cam. In the present construction there are four of these recesses spaced apart ninety degrees about the axis of the cam 56 and each receiving in one position of the cam 56 an outer end of one of the jaws 9. The outer ends of the jaws are desirably beveled as at 60 to slide smoothly over the cam surfaces 58. It will be understood that the jaws 9 are located in the face 23 of the cylnder 19 which is fixed against rotation with respect to the cam 56. Thus as the arm 54, by depression of the pedal 28, is moved from the position shown in Figure 13 to or toward the position shown in Figure 14, the cam 56 is rotated, and the outer ends of the jaws 9 are forced out of the recesses 59 and ride up the tangential cam surfaces 58, and the jaws are thus forced centripetally to engage the plug 1 and produce the indentations 9a therein, as already described. A shoulder 55a on the cylinder 19 retains the annulus 55 in rotative position on the cylinder.

So constructed and arranged, I have provided a connection between the treadle 28 and the arm 54 by which when the treadle 28 is depressed, as for example by the foot of an operator, the arm 54 is moved downwardly against the action of the coil spring 41, which, in turn, restores the arm to its uppermost position when the pressure of the foot is released. I have also provided an extensible and resiliently yielding connection between the treadle 28 and the arm 54, here represented by the structure including the sleeve 44, plunger 47, and coil spring 49, which is in the nature of a lost motion connection.

The operation of this extensible connection is as follows: As the treadle 28 is depressed, the jaws 9 move centripetally or inwardly in proportion to the distance which the treadle is moved downwardly, until a predetermined resistance is encountered by the jaws. When the jaws encounter a predetermined resistance from the plug 1, and while the treadle 28 is still being moved downwardly by the foot of the operator, the spring 49 yields and is compressed to permit relative movement between the plunger 47 and the sleeve 44, tending to separate the plunger from the block 42 and extending the connection between the treadle and the jaws. Thus, provided the spring 49 is not fully compressed, no more pressure can be placed upon the plug 1 than the counter-pressure of the spring 49. In this instance I provide that the block 42 shall strike the extension or stop 39 before the plunger 47 and sleeve 44 would normally move a sufficient distance relatively to fully compress the spring 49, and preferably before the jaws have moved to their extreme innermost position as shown in Figure 14. Obviously, the block 42 also strikes the stop 39 before the treadle 28 strikes the floor.

By this arrangement a predetermined pressure is automatically placed upon the plugs 1, independent of the pressure applied by the operator, provided only that the operator moves the treadle downwardly a sufficient distance to cause the block 42 to strike the stop 39. Consequently, if the resistance encountered by the jaws 9 from plug 1 and wire received therein is slightly greater in a given instance than in another, the jaws will move together a less distance to compensate for the greater resistance. Thus the mechanism automatically compensates for slight variations in the bores of the plugs or in the diameters of the wires received therein. For example, if the bore of the plug is relatively large with respect to the diameter of the wire received therein, the resistance offered will be less than if the wire were received in the bore more snugly, and since the predetermined pressure is uniform, the jaws 9 will move inwardly a relatively greater distance to sufficiently reduce the bore of the plug to suitably deform the wire and effect the practically fused metal-to-metal coupling already described.

By rotative adjustment of the sleeve 44 with respect to the block 42, the pressure of the spring 49 may be varied to effect the desired predetermined pressure upon the plugs. For example, if the sleeve and block are moved in a direction toward each other, the counter-pressure offered by the spring 49 will be increased so that the jaws will move inwardly a greater distance for a given resistance encountered, and conversely if the sleeve and block are moved relatively in the opposite direction. Thus I assure a predetermined pressure on the plugs and wire which will sufficiently compress them to effect a secure coupling but will not be sufficient to break or weaken the plug or wire, this desirable result being obtained automatically by the inherent operation of the mechanism described.

To automatically restore the jaws 9 to their outermost position, when the arm 54 is moved back to the position shown in Figures 9 and 13, by the action of the spring 41, I may provide relatively light compression springs 61 received in radial bores 62 in the fixed cylinder 19 parallel to the grooves 22 in face 23 of this cylinder. Fingers represented by the pins 63 fixed to the jaws 9, as by being each received in a hole 63a in each of the jaws 9, compress the springs 61 when the jaws are moved inwardly, and these springs thereby restore the jaws to their outermost position in the recesses 59 when the pressure upon the jaws is relieved. The pins 63 may slide in slots 64 which connect the grooves with the recesses 62.

The terminal so provided for the wire 2 by the plug 1 may be assembled with a circuit continuing device such as one which includes the block 65 (Figure 1) which in turn may be appropriately secured to an insulating mounting 66. The plug 1 is received in a cylindrical aperture 67 in the block 65 and the plug is pressed to one side of this aperture by a strong coil spring 68 through the intermediation of a detent 69 carried by the block. To enhance the area of contact between the plug 1 and the block 65, the plug may have two spaced apart contacting surfaces, one represented by the shank portion 4 of the plug and the other by a similar cylindrical portion 70. The spring 68 presses both the shank portion 4 and the cylindrical portion 70 against one wall of the aperture 67 and as so constructed and arranged the voltage drop between the plug and block is substantially reduced. The detent 69 snaps into an annular groove 71 between the tapered tip of the plug 1 and the shank portion 4, making a yielding but secure engagement between the plug and the block. The block 65 may terminate at its other end in a metallic spring pressed contact 72 for contacting, for example, with a central contact on a lamp base (not shown). A structure similar to that shown in Figure 1 is more fully described and claimed in my copending application Serial Number 713,713 filed March 2, 1934.

The wire terminal instead of being a plug as in the exemplification heretofore described, may be a spring jack adapted to snap over the tapered tip of the plug 1 to provide a line connection between two electrical conductors, both of which are wires. In Figures 18, 19 and 20, I have shown such a spring jack 73 which may be bored as at 74 to receive the bared end of the wire 2 and counterbored as at 75 to receive the insulation 3, similarly to the bore and counterbore in the plug 1. In the region of the bore 74 the external diameter of the jack is preferably reduced as at 76, in any convenient manner not necessary to be here described, and the wall of the jack at this point may be swaged in accordance with the present invention to produce the indentations 77 therein and the consequent reduction of the bore 74, as already described with respect to bore 6 of the plug 1. The machine of my present invention may be employed for swaging the jack terminal 73, as well as the plug terminal 1, by removing the plate 17 and inserting the jack 73 with its two semi-cylindrical complementary spring portions 78 and 79 over the mandrel 80 which is located in a central bore 81 of the cylinder 19 adjacent the jaws 9 as shown in Figure 18. The mandrel 80 may be adjustably retained against axial movement by a head 82 on the mandrel, threaded in a counterbore 83 in the bore 81 and locked in position by a nut 84 which abuts the cylinder 19. The head 82 may have a kerf 86 in its outer end, so that it may be adjusted in position by a screw-driver.

To position the jack 73 for swaging at the proper point the mandrel 80 has a shoulder 85 against which the end of the jack 73 abuts.

As shown in Figure 20, the spring jack 73 may receive the plug terminal 1, the semi-annular internal ribs 89 and 90 on the spring portions 78 and 79, respectively, of the jack 73, snapping over the tapered tip of the plug 1 and being yieldingly retained in the annular groove 71 in the plug by the inherent resiliency of the spring portions 78 and 79, which function in some respects similarly to the spring pressed detent 69 of the block 65 shown in Figure 1.

It will be observed that I have provided means for placing a relatively great pressure upon the terminal and wire from four points, together with automatic means for insuring that the pressure at each point shall be equal, so that the terminal and wire will be welded, so to speak, into an almost integral coupling, and I accomplish this without danger of breaking or weakening the metal of the parts by applying the pressure from all four points at the same time and at the same rate of speed.

Furthermore, I have provided means for insuring that the pressure on different terminals and wires will be the same so that the relative extent of deformation will be equal. It frequently happens in practice that in stripping the insulation from the stranded wire, for example, some of the strands will be broken off. In that case the wire will fit more loosely in the bore of the plug and the jaws must move inwardly a greater distance to form the desired integral coupling between the plug and the wire. By the means which I have provided, as already explained, this desirable result is automatically attained in a device which is very rigid, very accurate in its movements, and capable of applying tremendous pressure. The means I have provided also function satisfactorily when a plurality of conductors are inserted into the terminal.

Obviously, the invention is not limited to the details of construction here shown for purposes of exemplification. Furthermore, it is not essential that all of the elements of the invention be used conjointly, since various combinations and sub-combinations may be advantageously employed. Particularly, while I have shown the jaws 9 as provided with V-edges 26 which are straight-sided, the sides of the V may be concave, and also, the tip of the V may be truncated, so that the jaws are blunt-pointed instead of sharp-pointed.

I claim:

1. In a mechanism of the class described, the combination of radially movable complementary jaws directed toward a common center and in a common plane; a fixed cylinder concentric with said center; slots in the cylinder slidingly receiving said jaws; a guide plate fixed to said cylinder and having portions spaced apart therefrom, said jaws sliding between said cylinder and guide plate; an aperture in said guide plate concentric with said center; an annular cam rotatable on said cylinder and having its inner periphery engageable with the outer ends of said jaws; cam surfaces on said periphery engageable with said outer ends to move the jaws inwardly upon rotation of the cam in one direction; a spring individual to each jaw for urging the jaw to outermost position upon rotation of the cam in the opposite direction; means for rotating the cam; a rotatable arm; a plunger articulated with said arm; a sleeve closed at one end and open at the other, said plunger passing slidingly through the closed end of the sleeve; a head on the plunger within said sleeve; a coil spring surrounding said plunger between said head and said closed end; a block threadedly received in said open end; a rod fixed to said block; a fixed spring barrel receiving said rod therethrough; another coil spring between said block and said spring barrel for urging the rod in one direction; and a treadle articulated with the rod for urging it in the opposite direction.

2. In a swaging machine for uniting a metallic electrical terminal upon a conductor wire received therein, the combination of a stationary support, a plurality of more than two pointed jaws directed toward a common center and mounted for radial movement upon said support, an annulus rotatably mounted upon said support encircling the jaws and having inturned cam surfaces engaging the outer ends of the jaws to move them simultaneously toward the said center upon rotation of the annulus in one direction, an operating arm extending radially from the annulus, a foot operated treadle for applying manual power, a link connecting the arm and treadle for transmitting power to advance the jaws to engage the terminal, yielding means upon the link operative upon the jaws encountering a predetermined resistance to allow further movement of the treadle in the same direction without imparting further movement to the jaws.

3. The structure of claim 2 including spring means individual to each jaw for moving the jaws outwardly of said center upon rotation of the annulus in the opposite direction and means imparting a counter rotation to the annulus upon release of the treadle.

4. The structure of claim 2 wherein additional means is provided to return the annulus to open the jaws upon release of the treadle.

5. The method of affixing a metallic sleeve to metallic conductor means, comprising: disposing the conductor means in position in the sleeve, and swaging in the sleeve simultaneously at a plurality of places spaced about the periphery of the sleeve, by driving a plurality of pointed dies into the sleeve at those places, forging localized sections of the sleeve ahead of said dies, producing a force on the underlying metal of said sections causing a flow of the inner metal of the sleeve with the outer portions of the sleeve intermediate said sections remaining substantially static as respects any substantial outward flow, to forge the sleeve and the conductor means at the plane of said sections into a solid cross-section.

6. The method of affixing a metallic sleeve to metallic conductor means, comprising: disposing the conductor means in position in the sleeve, and swaging in the sleeve simultaneously at at lease three places spaced about the periphery of the sleeve, by driving at least three pointed dies into the sleeve at those places, forging localized sections of the sleeve ahead of said dies, producing a force on the underlying metal of said sections causing a flow of the inner metal of the sleeve with the outer portions of the sleeve intermediate said sections remaining substantially static as respects any substantial outward flow, to forge the sleeve and the conductor means at the plane of said sections into a solid cross-section.

7. The method of affixing a metallic sleeve to metallic conductor means, comprising: disposing the conductor means in position in the sleeve, and swaging in the sleeve simultaneously at at least three places spaced about the periphery of the sleeve, by driving at least three pointed dies into the sleeve at those places, forging localized sections of the sleeve ahead of said dies, producing a force on the underlying metal of said sections causing a flow of the inner metal of the sleeve with the outer portions of the sleeve intermediate said sections remaining substantially static as respects any substantial outward flow, to forge the sleeve and the conductor means at the plane of said sections into a solid cross-section, with the cross-section of said conductor means at said plane in the form of a polygon having sides equal in number to the number of said dies.

8. A machine for affixing a metallic sleeve to metallic conductor means, comprising: supporting means, leaving space for a sleeve having conductor means positioned therein; a plurality of pointed swaging dies, mounted in said supporting means for relative movement simultaneously against a plurality of places on the sleeve spaced about the periphery of the sleeve, and operable on advancement thereof to drive into the sleeve at those places, to forge localized sections of the sleeve ahead of said dies, to produce a force on the underlying metal of said sections causing a flow of the inner metal of the sleeve with the outer portions of the sleeve intermediate said sections remaining substantially static as respects any substantial outward flow, to forge the sleeve and the conductor means at the plane of said sections into a solid cross-section; and actuating means for said dies, operable to effect such advancement of said dies.

9. A machine for affixing a metallic sleeve to metallic conductor means, comprising: supporting means, leaving space for a sleeve having conductor means positioned therein; at least three pointed swaging dies, mounted in said supporting means for relative movement simultaneously against at least three places on the sleeve spaced about the periphery of the sleeve, and operable on advancement thereof to drive into the sleeve at those places, to forge localized sections of the sleeve ahead of said dies, to produce a force on the underlying metal of said sections causing a flow of the inner metal of the sleeve with the outer portions of the sleeve intermediate said sections remaining substantially static as respects any substantial outward flow, to forge the sleeve and the conductor means at the plane of said sections into a solid cross-section; and actuating means for said dies, operable to effect such advancement of said dies.

10. A machine for affixing a metallic sleeve to metallic conductor means, comprising: supporting means, leaving space for a sleeve having conductor means positioned therein; at least three pointed swaging dies, mounted in said supporting means for relative movement simultaneously against at least three places on the sleeve spaced about the periphery of the sleeve, and operable on advancement thereof to drive into the sleeve at those places, to forge localized sections of the sleeve ahead of said dies, to produce a force on the underlying metal of said sections causing a flow of the inner metal of the sleeve with the outer portions of the sleeve intermediate said sections remaining substantially static as respects any substantial outward flow, to forge the sleeve and the conductor means at the plane of said sections into a solid cross-section with the cross-section of said conductor means at said plane in the form of a polygon having sides equal in number to the number of said dies; and actuating means for said dies, operable to effect such advancement of said dies.

11. A machine for affixing a metallic sleeve to metallic conductor means, comprising: supporting means, leaving space for a sleeve having conductor means positioned therein; a plurality of pointed swaging dies, mounted in said supporting means for relative movement simultaneously against a plurality of places on the sleeve spaced about the periphery of the sleeve, and operable on advancement thereof to drive into the sleeve at those places, to forge localized sections of the sleeve ahead of said dies, to produce a force on the underlying metal of said sections causing a flow of the inner metal of the sleeve with the outer portions of the sleeve intermediate said sections remaining substantially static as respects any substantial outward flow, to forge the sleeve and the conductor means at the plane of said sections into a solid cross-section; and actuating means for said dies, operable to effect such advancement of said dies; and means for limiting the amount of force said actuating means may apply to said dies for driving said dies into the sleeve, to prevent application of excessive force likely to split the sleeve.

12. A machine for affixing a metallic sleeve to metallic conductor means, operable to affix a sleeve of any one of various cross-sectional areas to conductor means of any one of various cross-sectional areas, comprising: supporting means, leaving space for a sleeve having conductor means positioned therein; a plurality of pointed swaging dies, mounted in said supporting means for relative movement simultaneously against a plurality of places on the sleeve spaced about the periphery of the sleeve, and operable on advancement thereof to drive into the sleeve at those places, to forge localized sections of the sleeve ahead of said dies, to produce a force on the underlying metal of said sections causing a flow of the inner metal of the sleeve with the outer portions of the sleeve intermediate said sections remaining substantially static as respects any substantial outward flow, to forge the sleeve and the conductor means at the plane of said sections into a solid cross-section; actuating means for said dies operable to effect such advancement of said dies; and means whereby despite variation in cross-sectional area of the sleeve or the conductor means or both, said actuating means advances said dies the distance requisite to forge the sleeve and the conductor means into a solid cross-section at the plane of said sections.

13. A machine for affixing a metallic sleeve to metallic conductor means, comprising: supporting means, leaving space for a sleeve having conductor means positioned therein; a plurality of pointed swaging dies, mounted in said supporting means for relative movement simultaneously against a plurality of places on the sleeve spaced about the periphery of the sleeve, and operable on advancement thereof to drive into the sleeve at those places to forge localized sections of the sleeve ahead of said dies, to produce a force on the underlying metal of said sections causing a flow of the inner metal of the sleeve with the outer portions of the sleeve intermediate said sections remaining substantially static as respects any substantial outward flow, to forge the sleeve and the conductor means at the plane of said sections into a solid cross-section; an operating member for said dies, having a normal position in which said dies are retracted to a predetermined position; means for transmitting force to said operating member to thereby advance said dies; stress limiting means associated with said force transmitting means for limiting the stress which may be applied to said dies to advance said dies, while permitting said dies to continue to act against the sleeve after said stress limiting means limits said stress; and means for adjusting said stress limiting means, while leaving said operating member in its normal position.

HARRY A. DOUGLAS.